United States Patent
Kauss

[19]

[11] Patent Number: 5,860,484
[45] Date of Patent: Jan. 19, 1999

[54] HYDRAULIC DIRECTIONAL-CONTROL DEVICE WITH SINGLE LEVER FOR VEHICLE

[75] Inventor: Wolfgang Kauss, Sainte-Foy-les-Lyon, France

[73] Assignee: Mannesmann Rexroth S.A., Venissieux, France

[21] Appl. No.: 838,683

[22] Filed: Apr. 9, 1997

[30] Foreign Application Priority Data

Apr. 16, 1996 [FR] France ................................. 96 04727

[51] Int. Cl.$^6$ .................................................. B62D 11/04
[52] U.S. Cl. ............................ 180/6.48; 60/443; 60/484; 91/522
[58] Field of Search .................................. 180/6.48, 6.66, 180/333; 60/443, 444, 484; 91/522, 536

[56] References Cited

U.S. PATENT DOCUMENTS

| 4,076,090 | 2/1978 | Krushce et al. | 180/6.48 |
| 4,457,387 | 7/1984 | Taylor | 180/6.48 |

FOREIGN PATENT DOCUMENTS

| 0 040 381 | 11/1981 | European Pat. Off. . |
| 2 474 428 | 7/1981 | France . |
| 37 22 544 A1 | 1/1989 | Germany . |

*Primary Examiner*—Peter C. English
*Attorney, Agent, or Firm*—Larson & Taylor

[57] ABSTRACT

Hydraulic device for directional control of a vehicle using a single lever. The device includes a hydraulic manipulator (1) with four outlets, forward/reverse and right/left. A selection device (4) with four selectors (5) in a bridge is connected to the manipulator, and the outputs are connected to four motors for reverse-left, forward-left and reverse-right and forward-right control of the running components of the vehicle. A slide valve (7) with two positions, respectively one with direct connections and one with crossed connections, is inserted into the two feed lines of the motors (6 AVG, 6 AVD or respectively 6 ARG, 6 ARD). A control input (10) of the slide valve is connected to the FORWARD and REVERSE outputs of the manipulator, by virtue of which the control of the vehicle remains fully ergonomic, including for a rotation of the vehicle about a central vertical axis.

3 Claims, 2 Drawing Sheets

HYDRAULIC DIRECTIONAL-CONTROL DEVICE WITH SINGLE LEVER FOR VEHICLE

FIELD OF THE INVENTION

The present invention relates to improvements made to hydraulic devices for directional control (forward, reverse, right, left) of a vehicle using a single control lever.

BACKGROUND OF THE INVENTION

Referring to FIGS. 1 and 1A, a device of this type conventionally comprises a hydraulic manipulator 1 with four hydraulic outlets, respectively denoted by AV for the forward movement control, AR for the reverse movement control, D for the right movement control and G for the left movement control. The manipulator 1 includes four hydraulic pressure reducers 3, respectively denoted by 3 AV, 3 AR, 3 D and 3 G, the outputs of which constitute the four aforementioned outlets of the manipulator 1 and which are furthermore connected to a common pressurized-fluid input P and a common return-to-reservoir output T. The four reducers 3 are arranged in a cross, associated in pairs with two substantially perpendicular directions FORWARD/REVERSE and RIGHT/LEFT, and are in general operated mechanically, via respective sliding tappets (not shown), with the aid of a single oscillating cam (not shown) with a central neutral position N, to which a single actuation lever 2 is attached (FIG. 1A).

A selection device 4 is functionally associated with the manipulator 1 and includes four selectors 5, arranged in a bridge, the pairwise opposite vertices of which are respectively connected to the four outlets AV and AR, on the one hand, and D and G, on the other hand, of the manipulator. The four selectors are respectively denoted by 5 AVG, 5 AVD, 5 ARG and 5 ARD (FIG. 1).

In the conventional set-up adopted usually to date, the respective outputs of the four selectors 5 are connected directly to four variable-capacity motors 6 for directional control of the vehicle, which are denoted respectively by 6 ARG, 6 AVG, for the left running-component control, and 6 ARD and 6 AVD, for the right running-component control, as represented in FIG. 1.

The manipulator is installed ergonomically in the vehicle, that is to say the movement of the actuation lever 2 coincides with the direction of movement desired for the vehicle: the AV/AR movement direction of the lever 2 coincides approximately with the longitudinal axis of the vehicle, and the D/G direction coincides approximately with the transverse axis of the vehicle.

However, a directional control thus arranged according to the prior art does not allow control of a pure rotation of the vehicle about a central vertical axis. Indeed, such pure rotation of the vehicle about a central vertical axis (or counter-rotation) without forward or reverse movement, should be controlled by movement of the lever 2 in just the G direction, for a counter-rotation to the left, or in just the D direction, for a counter-rotation to the right, without any movement of the lever towards AV or towards AR.

However, referring to the hydraulic diagram in FIG. 1, it is seen that moving the lever 2 just to the left, for example, causes simultaneous opening of the two selectors 5 AVG and S ARG, which transmit the same hydraulic signal to the motors 6 ARG and 6 AVG, while the motors 6 ARG and 6 AVG remain inactivated. The result of this is that the forward and reverse two running components on the left-hand side are controlled simultaneously with the same intensity, and under this condition the vehicle does not move. The same would be true with movement of the lever 2 to the right.

For this single counter-rotation control, one solution could consist in crossing the feeds of the motors 6 ARG and 6 ARD, and arranging that the selector 5 ARG is then connected to the motor 6 ARD and that the selector 5 ARD is connected to the motor 6 ARG; then, in the case of, for example, moving the lever 2 to the left, the two selectors 5 AVG and 5 ARG would be simultaneously opened and would respectively control the motors 6 AVG and 6 ARD; the vehicle would then start to turn on itself in a pure rotation about its central axis. However, this rotation would then take place to the right, moreover with all the reverse controls being inverted at the same time. This would result for the driver in a difficulty from the ergonomic point of view, since the direction of the rotation performed by the vehicle would no longer correspond to the direction of movement of the lever.

SUMMARY OF THE INVENTION

The object of the invention is therefore essentially to propose a simple technical solution, which is purely hydraulic, for arranging that, if the lever 2 is moved for controlling counter-rotation or pure rotation about a central vertical axis, the vehicle performs this rotation in the direction corresponding to the movement of the actuation lever.

To this end, a hydraulic device for directional control (forward, reverse, right, left) of a vehicle using a single lever, is proposed, including:

a hydraulic manipulator with four hydraulic pressure reducers which are arranged in a cross while being associated in pairs to correspond respectively to the forward/reverse and right/left directions and which are actuated by a single oscillating cam with a central neutral position, to which a single actuation lever is attached, and a selection device with four selectors arranged in a bridge, two opposite vertices of which are joined to the respective outputs of the forward and reverse two pressure reducers of the manipulator, and the other two opposite vertices of which are joined to the respective outputs of the right and left two pressure reducers, the outputs of the four selectors being connected respectively to four variable-capacity motors for reverse-left, forward-left, reverse-right and forward-right control of the running components of the vehicle, which device, being arranged in accordance with the invention, is characterized essentially in that it furthermore includes a slide valve with two positions, respectively a position with direct connections and a position with crossed connections, which is inserted into the two feed lines of the two FORWARD-LEFT and FORWARD-RIGHT control motors, or respectively into the two feed lines of the two REVERSE-LEFT and REVERSE-RIGHT control motors of the running components, a control input of the slide valve being connected to the FORWARD and REVERSE pressure reducers of the manipulator.

By virtue of this arrangement, when the manipulator is moved to FORWARD or REVERSE while then optionally being moved to LEFT or RIGHT, the slide valve is arranged on the functional position with direct connections and the FORWARD-LEFT and FORWARD-RIGHT, or respectively REVERSE-LEFT and REVERSE-RIGHT according to the assembly adopted, selectors are respectively connected to the inputs of the two FORWARD-LEFT and FORWARD-RIGHT, or respectively REVERSE-LEFT and REVERSE-RIGHT, control motors of the running components; conversely, when the manipulator is moved only to LEFT or RIGHT without being moved simultaneously to FORWARD or REVERSE, the slide valve is brought into the functional position with crossed connections and the FORWARD-LEFT, or respectively REVERSE-LEFT, according to the assembly adopted, selection is connected to the FORWARD-RIGHT or, respectively REVERSE-RIGHT, running-component control motor of the vehicle, while feeding it with the LEFT signal fluid, and the FORWARD-RIGHT, or respectively REVERSE-RIGHT, selector is connected to the FORWARD-LEFT, or respectively REVERSE-LEFT, running-component control motor of the vehicle, while feeding it with the RIGHT signal fluid, so that the vehicle then rotates about a central vertical axis to the right or to the left depending on whether the lever of the manipulator is oriented to the right or to the left, respectively, without being moved to FORWARD or REVERSE.

The choice of inserting the distribution slide valve into the feed circuits of the two FORWARD-LEFT and FORWARD-RIGHT motors or of the two REVERSE-LEFT and REVERSE-RIGHT motors is of no consequence for implementing the invention since the same desired result is obtained in both cases, namely counter-rotation in a direction which coincides with the direction of movement of the lever 2.

Preferably, in order to avoid looped circulation of the pressurized fluid between the vertices AV and AR of the selector bridge, and in order to obtain efficient operation of the circuit, provision is made that the control input of the slide valve is connected to the FORWARD and REVERSE pressure reducers of the manipulator via two respective non-return valves.

In a simple embodiment, provision is made that the slide valve is provided with a spring for restoration to the crossed-connection position when the manipulator supplies no FORWARD or REVERSE information, whereas any AV or any AR control moves the slide valve into the direct-connection position.

The solution according to the invention is particularly beneficial because it employs an entirely hydraulic circuit, without any auxiliary control of electrical type; it uses only a small number of simple hydraulic components of conventional type; it is therefore inexpensive from the point of view of manufacturing, while providing an additional function which is useful for the user of the vehicle. Finally, the additional components which the invention employs can be grouped structurally with the selectors of the selector bridge in order to form a unitary assembly which is easy to fit, for example under the unit formed by the manipulator.

BRIEF DESCRIPTION OF THE DRAWINGS

The invention will be understood more clearly on reading the following detailed description of a preferred embodiment, given solely by way of purely illustrative example, in which.

DESCRIPTION OF THE PREFERRED EMBODIMENTS

Figure 1:
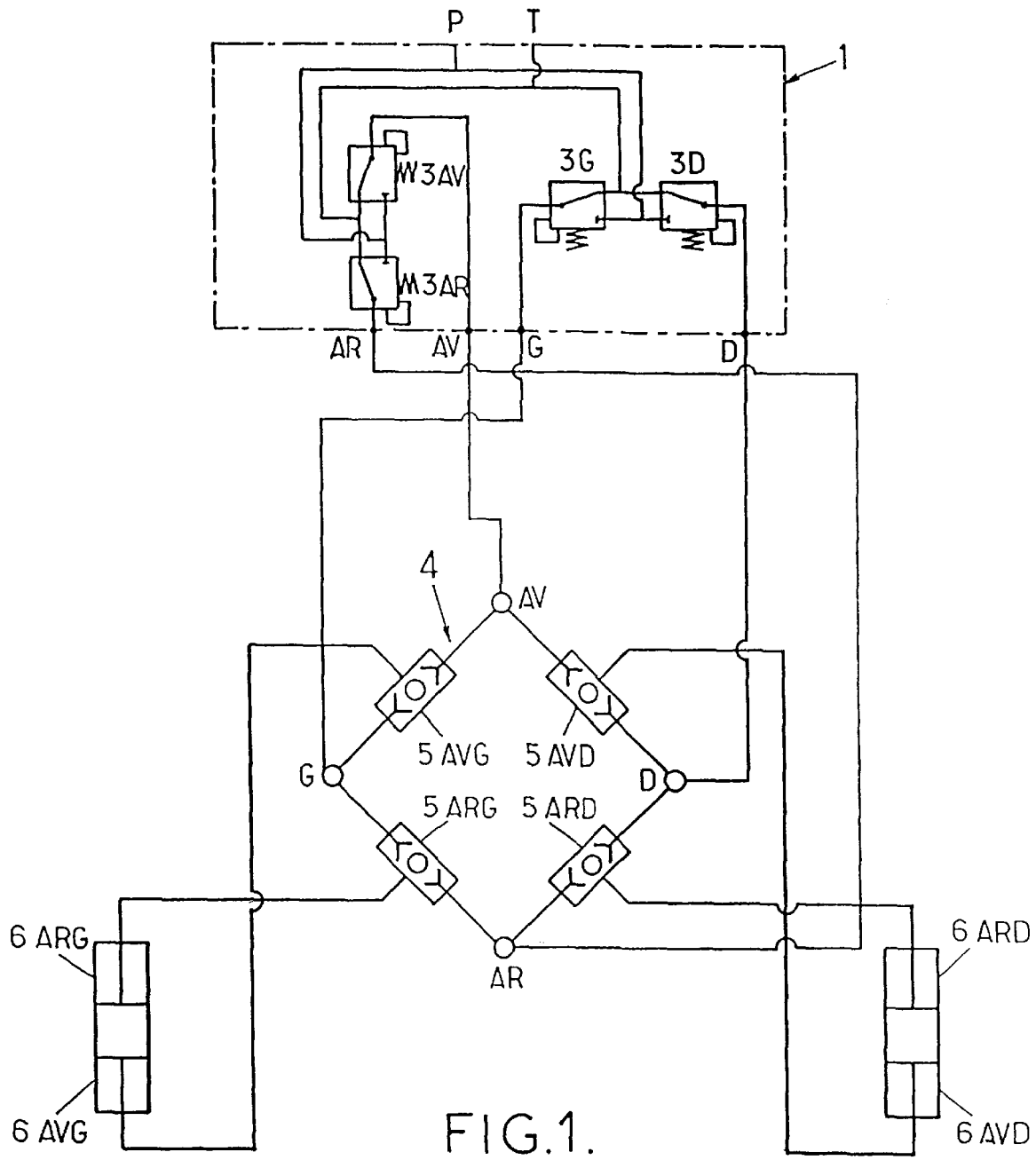
FIG. 1 is a schematic diagram of a prior art hydraulic manipulator.
Figure 1A:
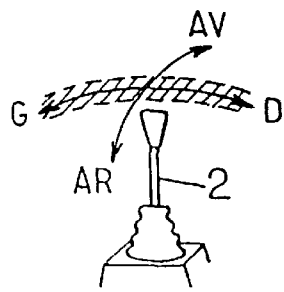
FIG. 1A is a schematic representation of a lever used with the hydraulic manipulator depicted in FIG. 1.
Figure 2:
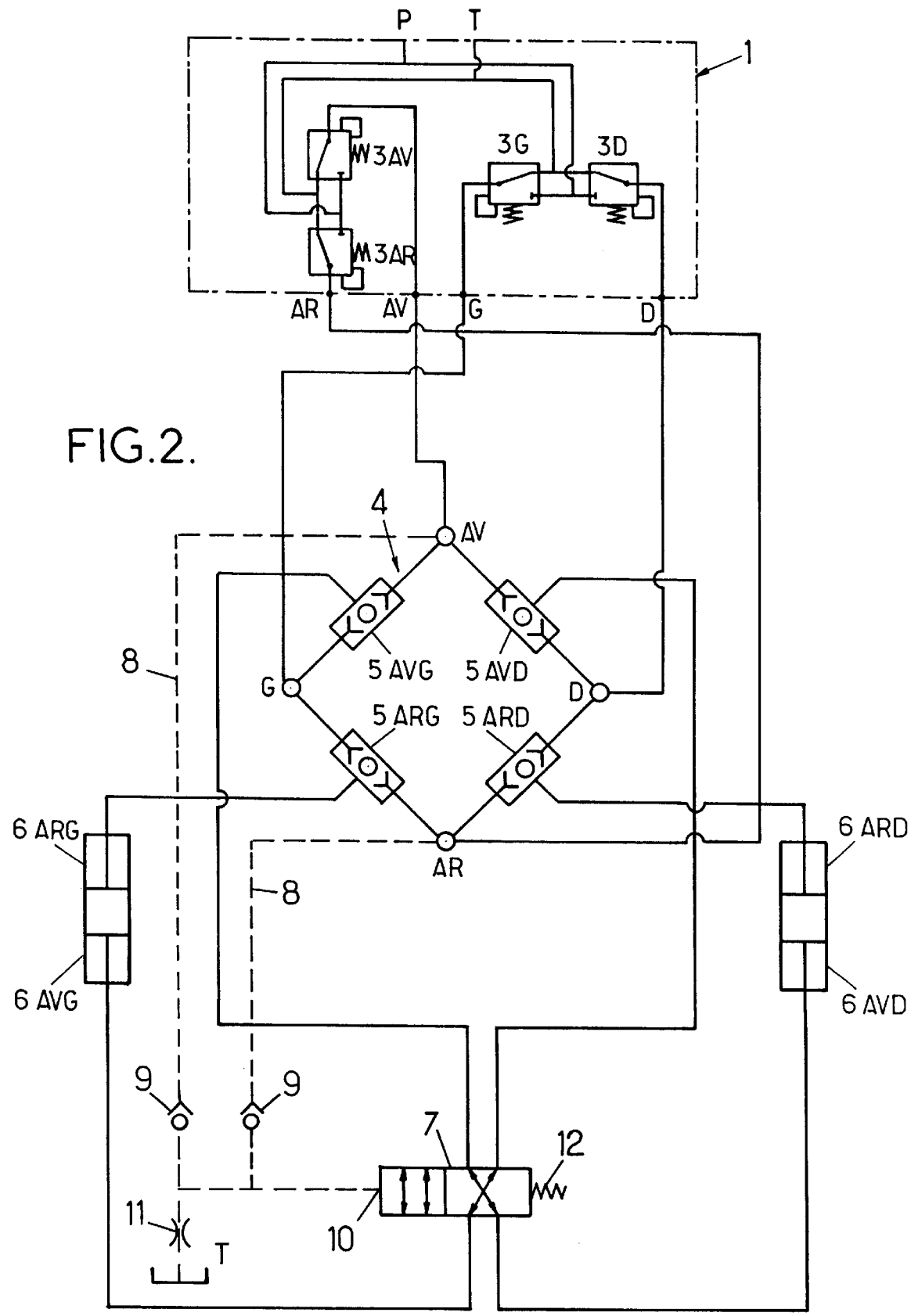
FIG. 2 is a schematic diagram of a hydraulic manipulator according to the present invention.

In the diagram in FIG. 2, the arrangements of the manipulator 1 and of the selector bridge 4 remain similar to the respective ones in FIG. 1. The output of the selector 5 ARG remains connected to the motor 6 ARG and the output of the selector 5 ARD remains connected to the motor 6 ARD.

Conversely, the outputs, of the selectors 5 AVG and 5 AVD are now connected to two inputs of a sliding valve 7 whose outputs are joined to the motors 6 AVG and 6 AVD respectively. The slide valve 7 is designed to occupy two functional positions selectively, in one of which it provides direct connections between its inputs and its outputs, and in the other of which it provides crossed connections between its inputs and its outputs.

Two control lines 8, connected respectively to the vertices AV and AR of the selector bridge 4 are joined in common to a hydraulic control input 10 of the slide valve 7, through two respective non-return valves 9. This common line is itself connected to the reservoir T through a constriction 11 in order to allow it to be drained in the absence of a pressure signal.

A restoring means, which may be a spring 12, acts on the slide valve 7 against the hydraulic control, in order to return the slide valve to its crossed-connection position (the position illustrated in FIG. 2) in the absence of a control signal at the control input 10 of the slide valve.

The device operates as follows.

When the lever 2 is moved to AV or to AR, optionally in conjunction with a movement to D or G, the pressure signal applied to the vertex AV or AR of the selector bridge 4 is transmitted to the input of the slide valve 7 and causes the latter to move into its direct-connection position. The selector 5 AVG is then connected to the motor 6 AVG and the selector 5 AVD is connected to the motor 6 AVD. The directional control device in FIG. 2 is then functionally identical to the conventional device in FIG. 1, and any movement of the lever 2 to AV or AR, optionally associated with a movement to D or G, is communicated to the motor(s) in question.

Conversely, when the lever 2 is moved exclusively to D or G, without concomitant movement to AV or AR, no signal is transmitted to the control input 10 of the slide valve 7, and the slide valve 7 is kept in its crossed-connection position by the spring 12. The selector 5 AVG is then connected to the motor 6 AVD and the selector 5 AVD is connected to the motor 6 AVG. Any movement of the lever 2 under these conditions leads to excitation of two opposite motors: the two motors 6 ARG and 6 AVD if the lever is moved to the left, or alternatively the two motors 6 ARD and 6 AVG if the lever is moved to the right. This then results in counter-rotation (or pure rotation about a central vertical axis) of the vehicle in a direction corresponding precisely to the direction of movement of the lever 2.

It will be noted that the four selectors 5, the bore in the slide valve, the slide valve 7, the spring 12, the two non-return valves 9 and the constriction 11, as well as all the corresponding conduits may be produced or housed in the same unitary module, which can be assembled mechanically with the base of the manipulator 1.

An identical result would have been obtained by inserting the slide valve 7 into the two feed lines of the two reverse motors, between the selector 5 ARG and the motor 6 ARG, on the one hand, and between the selector 5 ARD and the motor 6 ARD on the other hand.

As is self-evident, and as already results from the above discussion, the invention is in no way limited to those of its applications and embodiments which have been envisaged more particularly; on the contrary, it encompasses all variants thereof.

I claim:

1. Hydraulic device for directional control in forward, reverse, right, left directions of a vehicle using a single lever, comprising:

a hydraulic manipulator with four hydraulic pressure reducers which are arranged in a cross while being associated in pairs to correspond respectively to the forward/reverse and right/left directions and which are actuated by a single oscillating cam with a central neutral position, to which a single actuation lever is attached, a selection device with four selectors arranged in a bridge, two opposite vertices of which are joined to respective outputs of the forward and reverse two pressure reducers of the manipulator, and the other two opposite vertices of which are joined to respective outputs of the right and left two pressure reducers, the outputs of the four selectors being connected respectively by feed lines to respective inputs for four variable-capacity motors for reverse-left, forward-left, reverse-right and forward-right control of the running components of the vehicle, and a slide valve with two positions, respectively a position with direct connections and a position with crossed connections, which is inserted into the two feed lines of the two FORWARD-LEFT and FORWARD-RIGHT control motors, or respectively into the two feed lines of the two REVERSE-LEFT and REVERSE-RIGHT control motors of the running components, a control input of the slide valve being connected to the FORWARD and REVERSE pressure reducers of the manipulator and by virtue of which, when the manipulator is moved to FORWARD or REVERSE, the slide valve is arranged on the functional position with direct connections and the FORWARD-LEFT and FORWARD-RIGHT, or respectively REVERSE-LEFT and REVERSE-RIGHT, selectors are respectively connected to the inputs of the two FORWARD-LEFT and FORWARD-RIGHT, or respectively REVERSE-LEFT and REVERSE-RIGHT, control motors of the running components, and, when the manipulator is moved only to LEFT or RIGHT without being moved simultaneously to FORWARD or REVERSE, the slide valve is brought into the functional position with crossed connections and the FORWARD-LEFT, or respectively REVERSE-LEFT, selector is connected to the input of the FORWARD-RIGHT or, respectively REVERSE-RIGHT, running-component control motor of the vehicle, and the FORWARD-RIGHT, or respectively REVERSE-RIGHT, selector is connected to the input of the FORWARD-LEFT, or respectively REVERSE-LEFT, running-component control motor of the vehicle, so that the vehicle then rotates on a central vertical axis to the right or to the left depending on whether the lever of the manipulator is oriented to the right or to the left, respectively, without being moved to FORWARD or REVERSE.

2. Hydraulic control device according to claim 1, characterized in that the control input of the slide valve is connected to the FORWARD and REVERSE pressure reducers of the manipulator via two respective non-return valves.

3. Hydraulic control device according to claim 1, characterized in that the slide valve is provided with a spring for restoration to the crossed-connection position when the FORWARD and REVERSE pressure reducers of the manipulator are unactuated.

* * * * *